United States Patent [19]
Brückner et al.

[11] Patent Number: 5,654,763
[45] Date of Patent: Aug. 5, 1997

[54] METHOD FOR PROCESSING TELETEXT DATA TRANSMITTED IN A TELEVISION SIGNAL

[75] Inventors: Werner Brückner, München; Gerhard Eitz, Poing, both of Germany

[73] Assignee: Thomson Consumer Electronics Sales GmbH, Hanover, Germany

[21] Appl. No.: 436,247

[22] PCT Filed: Nov. 22, 1993

[86] PCT No.: PCT/EP93/03266

§ 371 Date: Jul. 3, 1995

§ 102(e) Date: Jul. 3, 1995

[87] PCT Pub. No.: WO94/13106

PCT Pub. Date: Jun. 9, 1994

[30] Foreign Application Priority Data

Nov. 24, 1992 [DE] Germany ............... 42 39 351.5

[51] Int. Cl.⁶ ................................................ H04N 7/04
[52] U.S. Cl. ................. 348/465; 348/468; 348/466
[58] Field of Search ............................ 348/465, 466, 348/468; 371/31, 49.1; H04N 7/04, 7/087

[56] References Cited

U.S. PATENT DOCUMENTS

| | | | |
|---|---|---|---|
| 4,719,510 | 1/1988 | Kinghorn | 348/468 |
| 4,931,870 | 6/1990 | den Hollander | 348/468 |
| 4,991,018 | 2/1991 | Davies | 348/468 |

*Primary Examiner*—Victor R. Kostak
*Attorney, Agent, or Firm*—Joseph S. Tripoli; Frederick A. Wein

[57] ABSTRACT

In order to increase decoding safety of the address frame of a teletext page during the reception of teletext data, and in particular of a page containing higher level supplementary data, without having to apply additional error control steps, the address frame for a teletext row is forecast from the decoded material, and if required, with a corrected address frame of the preceding teletext row. The forecast address frame is compared with the actually received address frame of the succeeding teletext row. If a deviation at two or more information units of a byte are detected during the comparison, and if required during decoding of the received address frame, the forecast address frame is used instead of the received address frame for addressing the data stream of the concerned teletext row.

7 Claims, 4 Drawing Sheets

N = USEFUL DATA INFORMATION UNIT (BIT)
S = PROTECTION DATA INFORMATION UNIT - HAMMING (8,4)

POSITION  8 7 6 5 4 3 2 1
          N S N S N S N S

UNDISTURBED BYTE: 0 0 0 0 0 0 1 0   "LINE 1"   (a)

DISTURBED BYTE: 1 1 0 0 0 0 1 0   NO CODE WORD   (b)
                X X DISTURBANCE

VALID CODE WORDS

I    1 1 0 0 0 1 1 1   "LINE 9"    (c)

II   1 1 0 1 0 0 0 0   "LINE 8"    (d)

III  1 1 1 0 1 0 1 0   "LINE 15"   (e)

IV   0 0 0 0 0 0 1 0   "LINE 1" ✓  (f)

FIG.4

METHOD FOR PROCESSING TELETEXT DATA TRANSMITTED IN A TELEVISION SIGNAL

BACKGROUND

The invention relates to a method according to the pre-characterizing clause of patent claim 1. Such a method is disclosed in EP-A-0 343 739.

For compatible transmission of supplementary data for a higher level within the normal television text cycle, it has been disclosed (DE-C-39 14 697) for the supplementary data to be transmitted in so-called supplementary pages. According to a proposal (DE-A-42 14 750) which has not been published, specific error protection information, which allows a plurality of errors to be corrected, is transmitted together with the supplementary data, for correction of transmission errors.

For compatibility reasons, the supplementary pages have the same address frame, which is protected using the Hamming code (8, 4), as the pages for the normal "Level 1" pages. Such a protected address frame for "Level 1" pages is disclosed in EP-A-0 343 739. The Hamming code is able to identify and to correct a one-bit error within one byte of the address frame; on the other hand, a double error within one byte can only be identified, but cannot be corrected. Thus, for example, in the case of such a double error in the line address, all the associated supplementary data can no longer be assigned to the relevant line by the decoder, so that they are lost. In this error case, it is necessary to wait until the relevant supplementary page is received again. If, on the other hand, a double error occurs only in one byte of the supplementary data itself, then this double error can be corrected completely, and without any waiting time, by the additionally transmitted error protection information. In consequence, the decoding of the address frame which is provided in the teletext specification has been found to be a bottleneck which partially destroys the error protection measures, which are provided in the abovementioned document for the supplementary data.

It is not feasible to overcome the bottleneck by modifying the address frame, for compatibility reasons. In addition, improved error protection of the address frame necessitates correspondingly increased redundancy which reduces the available useful data rate and increases the waiting time for a desired teletext page correspondingly.

In contrast, the object of the invention, in the case of a method of the type mentioned initially, is to achieve greater decoding reliability for the address frame of a teletext page, in particular a page having supplementary data for a higher level, without any additional error protection measures.

This object is achieved according to the invention by the features specified in patent claim 1.

Advantageous refinements and developments of the method according to the invention result from the subclaims.

In the case of the method according to the invention, the "address frame" bottleneck is improved in that the disturbed data, which have just been received, of the address frame are compared with one another [sic] with the previously received data which have been predicted in a special estimation and are possibly replaced by the predicted data. This makes it possible for a teletext decoder to reconstruct the address frame without errors even in the case of disturbances which go beyond the error protection which is additionally transmitted.

BRIEF DESCRIPTION OF THE DRAWINGS

The invention is explained in more detail in the following text with reference to exemplary embodiments which are illustrated in the drawings, in which:

FIG. 4 shows schematic illustrations of an undisturbed address frame and of a disturbed address frame, as well as various options for correction of the disturbed address frame.

DETAILED DESCRIPTION OF THE PREFERRED EMBODIMENT

Figure 1:
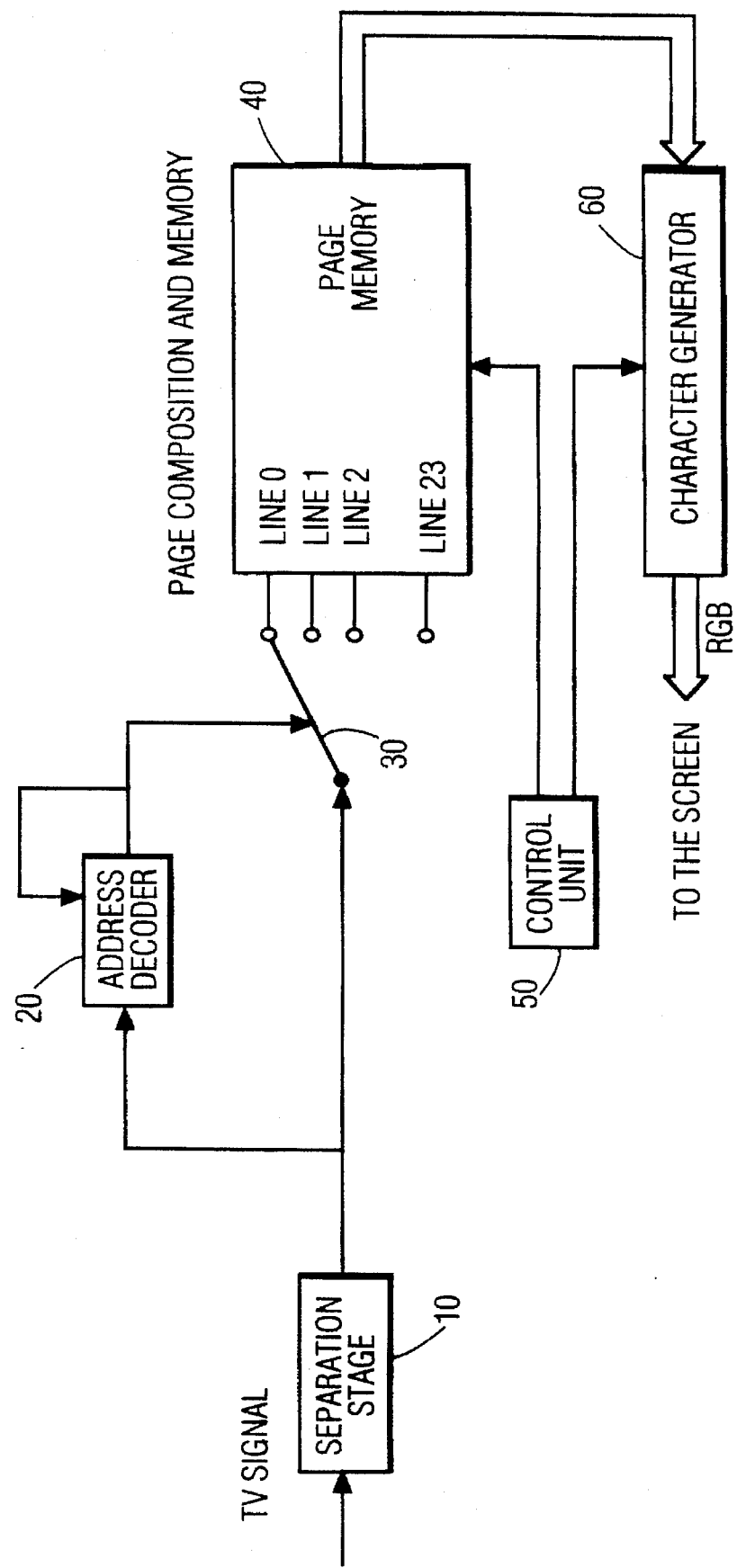
FIG. 1 shows a schematic illustration of a teletext decoder using the address decoder according to the invention.

The teletext decoder, which is illustrated only schematically in FIG. 1 and only with respect to the details required for understanding of the invention, has a data separation stage 10 which separates the teletext data stream contained in the incoming television signal from said incoming television signal. The separated teletext data stream is fed on the one hand to an address decoder 20 and on the other hand to a distribution device 30 which feeds the teletext data stream, governed by addressing information which is supplied by the address decoder 20, to the various data inputs, which are assigned to the teletext lines 0, 1 to 23, of a page memory 40.

As will be explained in detail in the following text with reference to FIG. 2, the address decoder 20 extracts address frame information from the teletext data stream, which information is decoded and is possibly subjected to error correction. The address frame information states that the following data in the teletext data stream are assigned to a specific line of a specific teletext page.

The individual teletext pages are collected line by line and buffer-stored in the page memory 40. The buffer-stored teletext pages are read out of the page memory 40, controlled by a control unit 50, on request from the teletext user to a character generator 60 which converts the teletext page into an R-G-B video signal for display on a screen.

The address frame which is decoded in the address decoder 20 comprises, in accordance with the teletext standard, two bytes per teletext line and is used to signal the magazine and line address of the respectively following teletext data.

Figure 2:
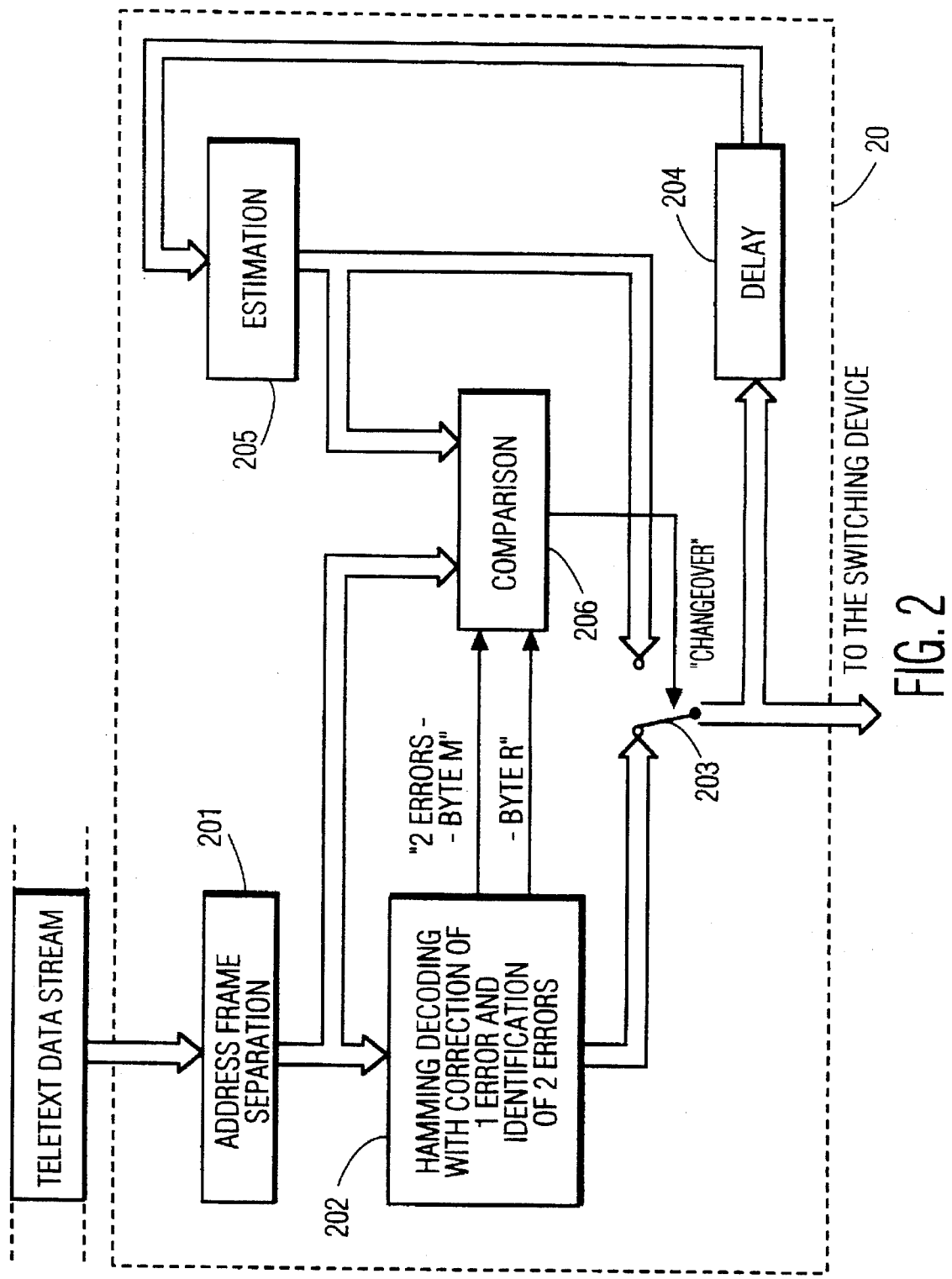
FIG. 2 shows a schematic illustration of a first exemplary embodiment of the address decoder according to FIG. 1, for correction of one or of two errors.

As can be seen in detail from the block diagram of a first exemplary embodiment for an address decoder according to FIG. 2, the two bytes of the address frame are obtained from the incoming teletext data stream by means of an address frame separator 201, and are fed to a Hamming decoder 202 in a known manner. If the two bytes M and R are disturbed with a maximum of one error per byte in each case, then the decoder 202 can identify and correct these errors using the Hamming (8, 4) error protection which is additionally transmitted. The bytes which have been identified as being correct and the corrected bytes are made available to be passed on to the distribution device 30 (FIG. 1) via a changeover switch 203, which is normally closed. Furthermore, the corrected bytes are delayed by means of a delay element 204 by, for example, a number of clock periods of the teletext data stream, and are fed to an estimation stage 205. The magazine number and line number of the next teletext line is predicted in the estimation stage 205 from the previously received, decoded and possibly error-corrected address frame, for example by the line number being incremented by one and the magazine number being maintained. The address frame, which has been predicted in this way, of the next teletext line is fed both to a comparator 206 and in [sic] the second input of the changeover switch 203.

If, for example, the estimation stage 205 receives the address frame information "magazine 2, line 22", then it calculates from this "magazine 2, line 23" as the next address frame. In contrast, the next address frame expected after "magazine 2, line 23" is "magazine x, line 0" and, after this, "magazine x, line 1", the index "x" indicating that no specific estimate for the number of the next magazine is possible in this case. The term "magazine" is understood to be the hundreds digit of the page number of the relevant teletext page.

If the Hamming decoder 202 detects a double error (discrepancy of two information units in a byte) in one or in both bytes of the address frame of a teletext line, then "two errors in byte M" or "two errors in byte R" is correspondingly signalled to the comparator 206. The comparator 206 then carries out a bit by bit comparison between the disturbed byte and the predicted byte of the address frame and operates the changeover switch 203 if two or four discrepancies in information units are also detected during the comparison. As a result of the changeover switch 203 switching over, the predicted address frame information is released for the line and page addressing of the teletext data screen, instead of the disturbed address frame information.

In order to explain the received address frame being exchanged for the predicted address frame, as described above, reference is made to FIG. 4 which shows four options of valid corrections using an undisturbed byte and a disturbed byte. The following premise must be adopted in order to understand this:

Theoretically, there are a total of only four options of plausible error correction for each byte which is protected by Hamming code (8, 4) and is disturbed by two random errors. In contrast, all the other 24 conceivable options are implausible. Using the method according to the invention, it is now possible to detect the correct code word from the four plausible error correction options, with the aid of the predicted address frame. As can be seen, for example, in FIG. 4a, the term "code word" is understood to be that part of the useful data N in each byte which contains a protection data element S after each useful data element N. Thus, in the case of the byte which is illustrated in FIG. 4a and has a total of eight data elements, the code word has four useful data elements N. A total of $2^4=16$ different code words can thus occur. If, for example, the information "line 1" (FIG. 4a) is disturbed at positions 7 and 8 (FIG. 4b), then a theoretically conceivable decoder initially attempts to invert the information units at positions 1 and 3 (FIG. 4c) from which the valid code word "line 9" results. If, in contrast, the positions 2 and 5 are inverted (FIG. 4d) as the supposed disturbance locations, then the valid code word "line 8" results. If the positions 4 and 6 are inverted (FIG. 4e), the valid code word which results is "line 15" and, if positions 7 and 8 are inverted (FIG. 4f), the valid code word "line 1" results again. There are no valid code words for any of the other inversion options. Since all four options in accordance with FIGS. 4c to 4f are plausible, the decoder does not "know" which of these plausible options is to be selected. This decision can be made using the method according to the invention, in the case of which only a single comparison of the disturbed information (FIG. 4b) with the predicted "line 1" information (FIG. 4a) is necessary. In doing so, it is found that there are differences at only two information units, specifically numbers 7 and 8, while in contrast the differences are greater, namely four, for all the other three plausible code words. The method according to the invention therefore identifies the code word "line 1" as the correct information. If more than two differences are found during the comparison, then the received information has either been disturbed by more than two errors or an incorrect prediction has been supplied.

The estimation of the next teletext line described above leads to the right correction of both errors for all the supplementary pages having data for a higher text level and in the case of those "level 1" pages in which all the lines of a page are transmitted successively and without any gaps. If, in contrast, any lines of a "level 1" page are not transmitted (adaptive transmission)—which can occur anyway in the case of "level 1" pages—then correct prediction is not possible in the case under discussion.

Figure 3:
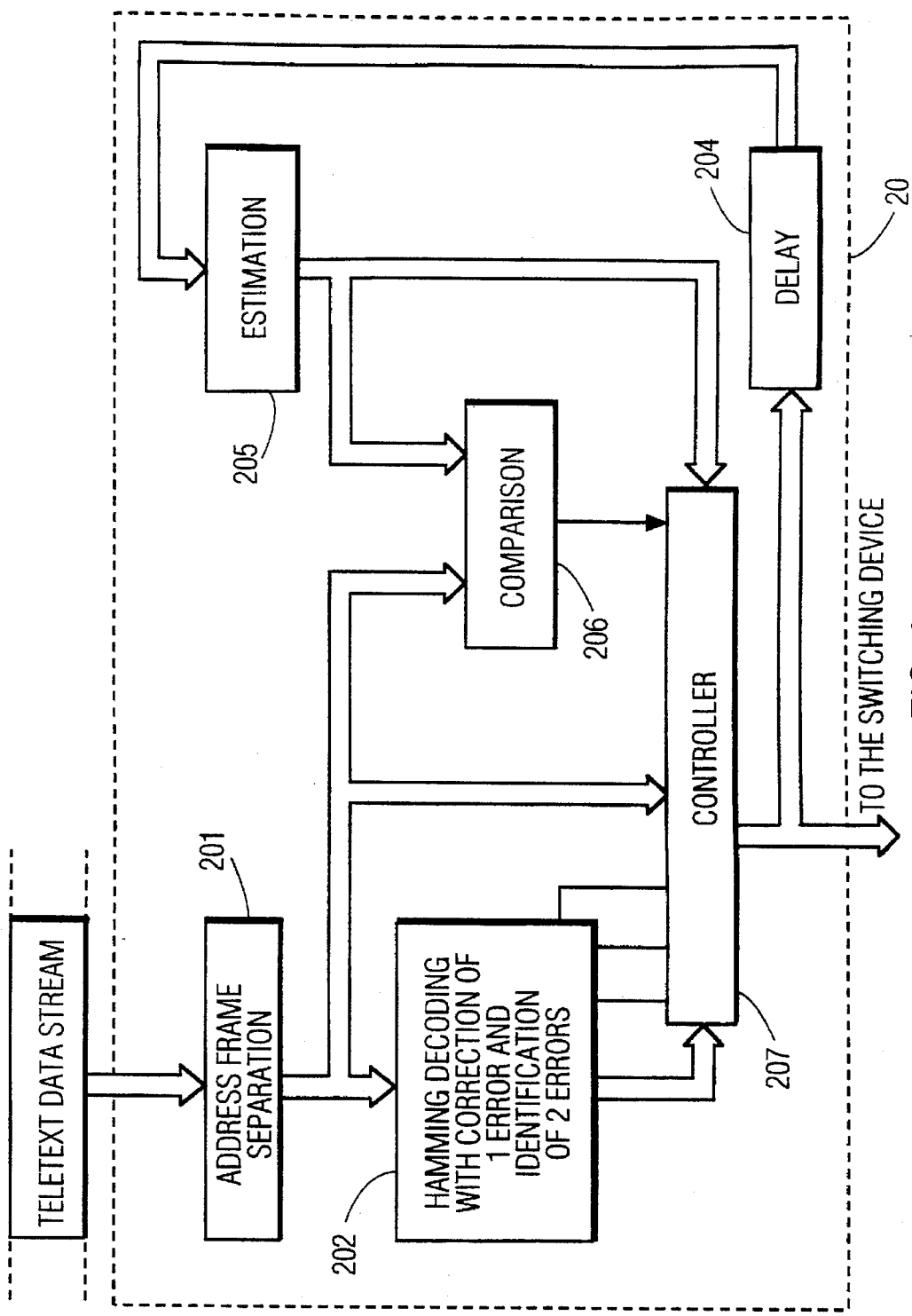
FIG. 3 shows a schematic illustration of a further development of the second embodiment according to FIG. 2.

An advantageous further development of the method according to the invention is explained with reference to FIG. 3. The embodiment according to FIG. 3 differs from the embodiment according to FIG. 2 in that the changeover switch 203 is replaced by an intelligent controller 207. The controller 207 receives the corrected data on the address frame and the message for 0, 1 or 2 errors from the Hamming coder 202, furthermore the disturbed data from the address frame separator 201, the "difference" message from the comparator 206 and the predicted data from the estimation stage 205. The controller 207 monitors the Hamming decoder 207 [sic] and is able, by means of continuous comparison between the possibly disturbed address frame information and the predicted address frame information, to detect whether the Hamming code is being overloaded. Overloading occurs whenever a byte of the address frame is disturbed by more than two errors. For example, a disturbance by three errors is corrected by the Hamming decoder 202 such that four errors are produced; a disturbance of four errors is, in contrast, identified as being fault-free or as having two faults. The discrepancy between the messages from the decoder 202 and the comparator 206 can be detected by the controller 207 in every case, as a result of which appropriate measures can be initiated. For example, in the event of the disturbance of three errors in one byte of the address frame information, the controller 207 identifies that the supposedly corrected address frame information has four differences, while in contrast the uncorrected address frame information has only three differences. In conjunction with the message from the decoder 202 of supposedly only one single error, the controller 207 unambiguously identifies that the Hamming code is overloaded and that the predicted address frame information must continue to be used rather than the corrected address frame information.

The controller 207 can furthermore detect a "level 1" page on the basis of the page number and adopt appropriate measures to optimize the estimation process. For example, it is necessary to assume that there may be missing lines in this case in the estimation, so that the prediction must still additionally be checked for plausibility.

An improvement in the method according to the invention can furthermore be achieved by transmitting a statement on the number of lines in the relevant supplementary page in the header line "line 0" of supplementary pages. This statement can be used during the estimation in the stage 205, to avoid waiting for lines which are not transmitted at all, in the case of supplementary lines having fewer lines than the normally intended 23 lines.

In the case of the parallel transmission of two or more magazines as respectively separate cycles (so-called parallel mode), a dedicated estimation stage 205 and comparison stage 206 can be provided for each magazine.

We claim:

1. Method for receiving teletext data transmitted in a television signal, comprising the steps of:

separating a data stream from the television signal, the data belonging to one teletext page and collected as teletext lines and teletext pages assembled and buffer-stored with an address frame being selected from the data stream, decoding and possibly subjecting said data to error correction to address teletext pages line by line, predicting the address frame for the subsequent teletext line from the decoded and possibly error corrected address frame of a teletext line;

comparing the predicted address frame with the actually received address frame of the subsequent teletext line, and if any deviation is detected in two or more information units of a byte during the comparison and possibly during the decoding of the received address frame, deciding as to whether the predicted address frame is to be used instead of the received address frame for addressing the data stream for the relevant teletext line.

2. Method according to claim 1, wherein detecting whether supplementary pages are present with data for a higher teletext level, and in the event of the presence of supplementary pages, and a detected discrepancy of more than two information units per byte, the predicted address frame is used.

3. Method according to claim 1 wherein delaying the decoded and possibly error-corrected address frame before the prediction is made.

4. Method according to claim 1, wherein a special supplementary page, which identifies the sequence of the teletext pages being transmitted at a given moment, is evaluated for the prediction and for the decision on the use of the predicted address frame.

5. Method according to claim 1 wherein specific information within a header line of each supplementary page having data for a higher level is evaluated, which identifies the number of lines in the relevant supplementary page, for the prediction and for the decision on the use of the predicted address frame.

6. Method according to claim 1 wherein in the event of parallel transmission of two or more magazines as respectively separate cycles in the same television signal, separate prediction and decision steps are provided for each magazine.

7. Method according to claim 1 wherein the address frame has two bytes, each having eight information units.

* * * * *